Jan. 10, 1967  R. McCLEAN ETAL  3,297,814
SEMI-CONDUCTING SHEATH SELF-SUPPORTING CABLE
Filed Nov. 2, 1964
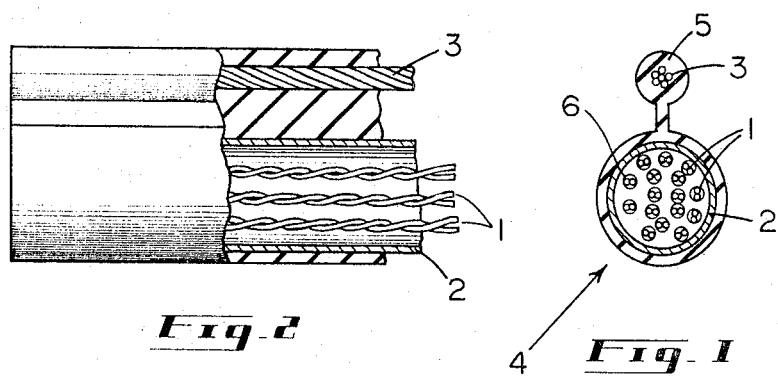
*Fig. 2*
*Fig. 1*
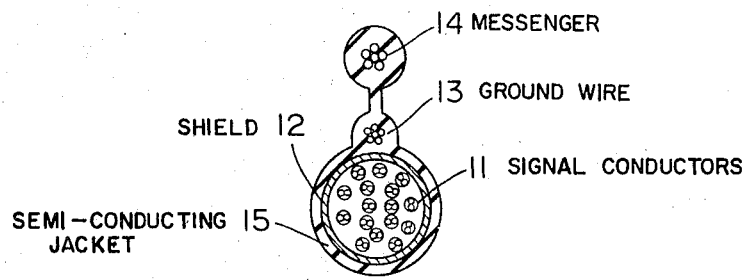
*Fig. 3*

United States Patent Office 3,297,814
Patented Jan. 10, 1967

3,297,814
SEMI-CONDUCTING SHEATH SELF-SUPPORTING CABLE
Robert McClean and Roger Joseph Lemieux, Dollard des Ormeaux, Quebec, Canada, assignors to Northern Electric Company Limited, Montreal, Quebec, Canada
Filed Nov. 2, 1964, Ser. No. 408,079
7 Claims. (Cl. 174—41)

This invention relates to a method of constructing a novel electrical cable and to such a cable made by the method.

In communications systems it is common to construct a cable of a number of wires and to surround the bundle of wires with an electrical conducting shield in order to reduce or eliminate the pick-up of interfering electrical signals by the wires. Since these cables are of considerable weight, those which do not have sufficient tensile strength for self support, when overhead mounted, are hung from a steel cable called a messenger.

In the past it has been usual to fasten the cable to the messenger at regularly spaced intervals along its length in order to provide proper support. An improvement of this has been the method of constructing the cable and the messenger with a single insulating sheath so that the cable is supported continuously, such as in the cable described in Northern Electrical Cable News C–8A May 1963. In this there is no nesessity of tying the cable to the messenger in the field. This construction however requires the removing of the insulating sheath at intervals along the length of the cable in order to bond the messenger and the electro-magnetic shield surrounding the cable together and to ground. The messenger and shield are thus maintained at the same potential and the impedance to ground is lowered. The procedure when carried out in the field, is quite delicate, requires the introducing of ground wires at each post between which the cable is supported and is time consuming for the rigging personnel.

When a fault does occur, such as by contact of the cable with a power line, only the shield or messenger will carry the fault current until a bonding point is reached. This can lead to cable damage by excessive heating, and the voltages present may break down the insulation on the information carrying lines.

It has been proposed in the past to cover a cable and uninsulated messenger with an overall lead sheathing. This construction is heavy, expensive and presents problems in extruding the sheath. Excessive heating and melting of the sheath may also occur during faults.

It is with the shortcomings of the prior art in mind that the present invention was made, and it is an object of the invention to provide a cable in which fault currents originating by contact with power lines are sufficiently large to operate the cut out relays but are safely conducted away without excessive heating. In shielded cables a further object is to provide good electro-magnetic screening, where the necessity of opening the sheath and making bonds from the shield to ground and messenger at frequent intervals is avoided.

While the practising of the invention will have particular reference to communications systems it is not limited to the use with signal cables and in some cases the cable might, for instance, be an insulated power conductor. In this specification therefore the term "information conductor" is not intended to be limited to electronic signal carrying cables.

More particularly in accordance with the teachings of the invention there is provided, in an electric cable comprising an information conductor, the improvement which comprises, a semiconducting jacket surrounding the information conductor and an electrical conductor (for instance the messenger or separate conducting wire) adjacent the information conductor, said jacket being in electrical contact with the electrical conductor and providing a resistive current path surrounding the information conductor and connected to the electrical conductor along the length of said information conductor.

The invention will now be more fully described with reference to the accompaning drawing in which:

FIGURE 1 shows a cross-sectional view of one embodiment of a communications cable constructed in accordance with the present invention, FIGURE 2 shows a side view, partly in section, of the cable of FIGURE 1, and FIGURE 3 shows a sectional view of a second embodiment of the invention.

In FIGURES 1 and 2 a set of twisted pairs, comprising conductors 1 covered by a suitable insulation 6 for the communication work for which they are intended, are enclosed within an electro-magnetic conducting shield 2 of thin metal such as aluminum, copper or other suitable conducting medium which is fairly flexible and of good conductivity. The shield 2 may, for example, be of foil (i.e., less than .001" thickness) or thin take (up to say .010" thickness). The cable assembly 4 is supported from a metal messenger wire 3, for instance steel or copperweld, by means of an integral sheath or jacket 5 surrounding the messenger 3 and the shield 2. The jacket 5 is made of a semi-conducting plastic material. This material is prepared for instance by incorporating powdered carbon into a plastic or elastomer. It is preferably polyethylene but may for instance also be polyvinylchloride or rubber containing the carbon particles. While the resistivity of the semiconducting jacket may be as great as $10^7$ ohm-cm. values less than $10^3$ ohm-cm. are considered more suitable for general use.

In the embodiment of FIGURE 3 conducting wire pairs 11 are screened by shield 12 and are arranged adjacent a ground wire 12 and a messenger 14. A semiconducting jacket 15 surrounds the ground wire, messenger, and shield.

The embodiments of FIGURES 1 to 3 have comprised a cable of twisted pairs with an electromagnetic shield, but in other instances the information cable might be coaxial with a single central conductor and surrounding shield. Sometimes an electromagnetic shield may not be necessary and the cable can merely consist of an assembly of twisted pairs or of single conductors. In all instances a semi-conducting jacket would surround the information cable and embrace the messenger in order to provide electrical connection to the messenger. When the cable includes an electromagnetic shield, in FIGURE 1 and 2 it will be noted that because of the semiconducting properties of the jacket 5 the shield 2 is continuously bonded to the messenger 3 and thus the necessity for opening up the cable to make connection to the shield is entirely avoided. Ground connection to the messenger would be made in the usual manner by grounding the messenger at suitable points. In FIGURE 3 the shield is bonded both to ground wire 13 and messenger 14. The cable of FIGURE 3 has advantages where it is not suitable, such as for economic reasons, to make the messenger fulfill the dual functions of support and ground conduction.

In operation it can be seen that now that any fault current carried by the cable due to contact with a power line will be shared by the semiconducting sheath, the electromagnetic shield and the messenger and ground wire (if present), in accordance with their respective impedances to ground. This is a great advantage over the prior art cables. The low impedance to ground increases the fault current but greatly reduces the time before the fault current relays operate and consequently reduces in general the overall heating and destruction of the cable.

If a thin foil is employed as the shield then the impedance to ground of cables of various sizes and capacities will be effectively constant provided all cables are constructed with messengers of the same size and material thickness. In practice this constant thickness is quite convenient to arrange and simplifies calculations for the setting of fault current relays. Using the cable constructed in accordance with the invention the electromagnetic shield may be extremely thin foil which would be totally impossible if it were called upon to carry any substantial fault current. This enables the cable to be made lighter and more flexible.

It is seen therefore that the inventive cable may be any one of an almost unlimited number of types of power, communication or signal type. An electromagnetic shield can be incorporated, made of a substance of high electrical conductivity such as aluminum or copper, or any other suitable flexible conducting medium which may be applied for instance as a continuous sheath or as a lap wound strip. The supporting messenger may be solid, or stranded, copper, aluminum, steel or combinations of these metals coated or uncoated. Although in FIGURES 1 to 3 the jackets 5 and 15 respectively have been shown as a figure of eight pattern, many other arrangements would be possible, as long as conducting path to ground for fault currents is achieved, where a shield is present, the additional advantage can be obtained of continuously bonding the shield to a ground conductor. This ground conductor can, if desired, be separate from the messenger (which is then provided merely for support) and conducts away fault currents by being grounded itself at regular intervals.

We claim:
1. In an electric cable comprising an information conductor the improvement which comprises an electrical conductor adjacent the information conductor, a semiconducting jacket having a resistivity of up to 10 ohm cms. surrounding the information conductor and the electrical conductor, said jacket being in continuous electrical contact with the electrical conductor and providing a resistive current path surrounding the information conductor and being connected to said electrical conductor along the length of said information conductor.

2. Apparatus as defined in claim 5 wherein the electrical conductor comprises a supporting messenger for said information conductor.

3. Apparatus as defined in claim 1 wherein the information conductor includes an electro-magnetic shield, said jacket surrounding said electro-magnetic shield and connecting said shield to the electrical conductor.

4. Apparatus as defined in claim 3 said jacket having a figure of eight cross-section, one loop of said eight embracing the electrical conductor and the other loop of said eight embracing the information conductor, said information conductor having an electromagnetic shield on its exterior.

5. Apparatus as defined in claim 4 said electromagnetic shield comprising a metallic foil selected from the group consisting of aluminum and copper and said jacket comprising a semiconducting plastic material.

6. Apparatus as defined in claim 5 said jacket comprising a material selected from the group consisting of polyethylene, polyvinylchloride and rubber, said material including carbon particles intimately dispersed therein.

7. Apparatus as defined in claim 6, the resistivity of said jacket being less than $10^3$ cms.

References Cited by the Examiner

UNITED STATES PATENTS

| 2,981,788 | 4/1961 | Bunish | 174—115 |
| 3,074,107 | 1/1963 | Kiyoshi Mose et al. | 264—174 X |
| 3,207,836 | 9/1965 | Sleckta | 174—70 X |

FOREIGN PATENTS 800,903   9/1958   Great Britain.

OTHER REFERENCES

Wire and Wire Products, November 1964—A New Slack Core Self-supporting Cable, Horn, pp. 1776, 1778, 1826, 1827.

Electrical World, June 26, 1961, pp. 31, Superior Cable advertisement.

LEWIS H. MYERS, *Primary Examiner.*

H. HUBERFELD, *Assistant Examiner.*